United States Patent [19]

McCoy et al.

[11] 3,914,308

[45] *Oct. 21, 1975

[54] SOLUBILIZING PROCESS

[75] Inventors: Frederic C. McCoy, Beacon, N.Y.;
Carl Loyal W. Swanson, deceased, late of Hopewell Junction, N.Y., by Viola C. Swanson, executrix

[73] Assignee: Texaco Inc., New York, N.Y.

[ * ] Notice: The portion of the term of this patent subsequent to Aug. 1, 1989, has been disclaimed.

[22] Filed: July 27, 1972

[21] Appl. No.: 275,680

Related U.S. Application Data

[63] Continuation-in-part of Ser. No. 878,586, Nov. 20, 1969, Pat. No. 3,681,348.

[52] U.S. Cl. ............................ 260/564 F; 424/326
[51] Int. Cl.² ...................................... C07C 123/00
[58] Field of Search................................ 260/564 F

[56] References Cited

UNITED STATES PATENTS 3,681,348   8/1972   McCoy et al. .................. 260/249.8

Primary Examiner—Gerald A. Schwartz
Attorney, Agent, or Firm—T. H. Whaley; C. G. Ries; Bernard Marlowe

[57] ABSTRACT

This invention concerns a process for converting N-(2-alkylidine) aminoguanidines, having 7 to 15 carbon atoms in the alkyl moiety, which are normally insoluble in petroleum oil, to soluble complexes by treatment with alkylated phenols, and to the oil-soluble complexes resulting therein. These N-(2-alkylidine) aminoguanidines have pesticidal, particularly anti-fungal activity.

7 Claims, No Drawings

SOLUBILIZING PROCESS

This invention is a continuation-in-part of Ser. No. 878,586 filed in the U.S. Patent Office Nov. 20, 1969 now Pat. No. 3,681,348.

This invention concerns a process for transforming certain pesticidal aminoguanidines normally insoluble in oil* to their oil solubilized forms.

*Oil-soluble as used herein refers to materials which do not possess sufficient solubility to permit the preparation of a clear 0.1% by wt. solution of SAE 20 paraffin based oil at 75°–80°F.

More particularly, this invention relates to a process for converting No. (2-alkylidine) aminoguanidines, wherein said alkyl moiety contains 7 to 15 carbon atoms which are insoluble in petroleum oils, to their oil-soluble products As set forth in U.S. Pat. No. 3,681,348 the solubilization of normally oil-insoluble pesticidal substances is advantageous, since by rendering an additive soluble in the desired oily substrate, serious problems of non-homogeneity, sedimentation and unstable viscosities of the final composition are overcome. The latter difficulties are frequently encountered when dispersions of oil-insoluble pesticides, particularly anti-fungal agents, are prepared for application to vegetation.

As is well known, anti-fungal agents are used to inhibit or to control the growth of fungi, as well as undesirable plant life. The need for oil-soluble anti-fungal substances is especially pressing in the treatment of plants in tropical or sub-tropical climates, or in the application of the more highly toxic agricultural pesticides. ** For example, in the aforementioned climates, humidity is high and the growth of fungi is difficult. This high humidity combined with frequent rainfall may remove and anti-fungal completely or render it ineffectual for protective purposes. This necessitates more frequent applications of anti-fungal which, in addition to being troublesome and costly, makes it difficult to control the growth of the fungus being treated, particularly if the anti-fungal has phytoloxic properties.

**Pesticides as defined herein include anti-fungal agents herbicides, and plant growth regulators.

In view of the above problems, particularly in the application of anti-fungals in areas of high humidity and high rainfall, there is a need for a process to transform normally oil-insoluble substances such as the N-(2-alkylidine) aminoguanidine agents into oil-soluble forms.

Recently it has been found that the process disclosed in U.S. Pat. No. 3,681,348 can be extended to N-(2-alkylidine) aminoguanidines containing 7 to 15 carbon atoms in their alkyl moiety; to yield stable, useful oil-soluble complexes having anti-fungal activity.

In practice, at least one normally oil-insoluble N-(2-alkylidine) aminoguanidine, containing 7 to 15 carbon atoms in the alkyl radical is admixed with at least a molar excess of at least one alkylated phenol-type compound to form a fluid mixture, and continuing said mixing until a substantially clear solution is obtained. The solution can be stored as is or any insoluble particles can be separated prior to storage or use.

In the preferred process N-(2-alkylidine) aminoguanidine normally insoluble in petroleum based oils is admixed with a molar excess ranging from about 2:1 to 8:1, of at least one hydroxylated benzene nucleus alkylated with alkyl groups containing from 6 to 12 carbon atoms, in the presence of sufficient inert solvent to provide a fluid, easily stirred mixture, then continuing said mixing at temperatures ranging between 20° and 100°C. until substantial solubilization of the compound takes place and a substantially clear solution is obtained. Again the solution may be clarified or not, concentrated or diluted for subsequent use.

In order to more clearly set forth the scope of the subject invention the following additional disclosure is submitted.

A. Alkylated Phenol Type Compound.

This is the generic designation used to define the solubilizing agents which solubilize the normally oil-insoluble substances. These solubilizing agents are chosen from the mono and dinuclear aromatics that contain at least one alkylating group and at least one hydroxyl group. The alkylating group or groups can contain a total of between 3 and 100 carbon atoms, desirably from 3 to 30 carbon atoms and preferably from 6 to 12 carbon atoms. The alkylating groups can be arranged in either branched chains or straight chains although branched claims are preferred. The alkylated phenol-type compound can be in form of relatively pure, discrete single compounds or in the form of blends or mixtures. Depending upon their physical state, solid or liquid, or the convenience of the user, the solubilizing compounds can be used with or without relatively low boiling inert solvents to assist in the solubilization process. These solvents, which are usually removed in a subsequent stripping operaion, are described infra.

Illustrative of the favored class of solubilizing agents are the alkylated hydroxy mononuclear phenols, cresols and the like, such as the butyl phenols, the pentyl phenols, the hexyl phenols, the heptyl phenols, the octyl phenols, the nonyl phenols, the decyl phenols, the undecyl phenols, the dodecyl phenols, the tridecyl phenols, their mixtures, particularly where the alkylating groups on the phenols contain from 6 to 12 carbon atoms and are branched rather than straight chain.

B. Conditions Required for Oil-Solubilization.

1 - Admixing Reactants. Generally speaking the admixture required for forming the reaction mixture can utilize any device capable of producing a homogeneous mixture. These include stirring devices, blending devices, mills, etc. No particular order of addition is required for operability. When the components are both liquids the usual procedure is to form a mixture of the normally oil-insoluble N-(2-alkylidine) aminoguanidine compound and a molar excess of alkylated-phenol type compound until the solution substantially clears, indicating that substantial solubilization has taken place.

2 - Temperature and Pressure. Ordinarily ambient temperatures (i.e. between 20° and 30°C.) are satisfactory for admixing the components of the mixture. To effect even more rapid solubilization and formation of the oil-soluble complexes both the alkylated phenol and N-(2-alkylidine) aminoguanidine to be solubilized are heated together with or without agitation until they blend. Ordinarily no advantage accrues in using temperatures below about 20°–30°C. so that temperature ranging from 20°C. and up are normally employed. The limiting factors in employing relatively high temperatures (i.e. above 100°C.) are the stability of said aminoguanidines component and/or the volatility of inert solvents that may be used. Volatility can be controlled by the use of a pressurized system but because of increased cost and operating hazards the usual practice is to use atmospheric pressures and temperatures not exceeding 100°C.

3 - Relatively Low-Boiling Inert Solvent. As indicated earlier, the use of one or more inert solvents boiling under 100°C. is desirable where difficulty is encountered in obtaining dissolution of the "aminoguanidines" in the alkylphenol. Generally speaking, most solvents or mixtures of solvents inert to reacting with one or both components, and sufficiently low-boiling to permit their ready removal by distillation at temperature not exceeding 100°C. can be employed. When inert solvents are employed they can form up to about 70% of the final mixture weight. These solvents can be stripped of using conventional atmospheric or vacuum distillation, or the blends containing them can be kept in the unconcentrated form. Illustrative solvents include the lower ketones such as acetone, methyl ethyl ketone, the cellosolves and mixtures of these solvents.

4 - Solubilization Times. The time required for preparation of the oil-insoluble form of the normally oil-insoluble compound cannot be stated with precision since it is dependent upon variables such as the nature of the oil-insoluble compound, the nature of the alkylated phenoltype compound, temperature employed and/or whether inert solvent is used. In some instances a clear, solvent-free concentrate can be attained in 10 minutes to one-half hour while in other cases as much as 2–3 hours or more are required. Most solubilization takes place within 1 to 2 hours.

5 Types of Oil used for Dilution. Generally speaking any mineral oil of suitable viscosity for use as a conventional agricultural spray oil can be used. These include naphthenic, paraffinic and certain types of asphaltic oils having Saybolt viscosities at 100°F. from about 30–400 seconds. The preferred oil mixtures for use with N-(2-undecylidine) aminoguanidine are mixtures of 0.1 to 10 % by weight of paraffinic oil having SUS viscosities of 50 to 100 and having an aromatic content less than 8%.

6 - Ratio of Phenol-Type Compound to N-(2-alkylidine) Aminoguanidine. A molar excess of the phenol-type solubilizating agent is desirable. The exact excess required is a variable dependent upon the substance being solubilized and by the minimum amount of "phenol" required to achieve satisfactory solubilization. In most instances molar ratios of about 2:1 to 8:1 and higher of solubilizing agent to insoluble material will suffice with a narrower range of about 2:1 to 4:1 being preferred.

7 - Preparation of Oil Solutions of Solubilized Compounds. After the complexes of alkylated phenol-type compounds and solubilized compounds are prepared they may be incorporated in oil by any of the conventional methods used in blending oil based compositions. For instance, the concentrate of solublized compounds plus oil may be heated to 40° to 60°C. with mechanical agitation for 15 minutes or more until a clear blend is achieved.

8 - Preferred Oil-Soluble Compositions. While a broad range of alkylated phenol-type solubilizing agents can be used, the favored group comprise the alkylated hydroxy mononuclear aromatics commonly referred to as "alkylphenols". Within this relatively narrow class, the preferred solubilizers are those monohydroxylated benzenes alkylated with alkyl groups containing from 6 to 12 carbon atoms, preferably branched. These compositions comprise from 25 to 95 parts by weight of these solubilizing agents and from 75 to 5 parts by weight of one or more N-(alkylidine) aminoguanidines where alkyl radical contains 10 to 12 carbon atoms. These are preferred because they are effective against rust infestations such as cereals, beans and coffee.

9 - Compounding Oil-Based Anti-Fungal Compositions. Since the solubilized anti-fungal agents of this invention have solubility in petroleum-derived solvents they may be incorporated into a convenient petroleum-derived solvent in concentrations sufficient to achieve the desired fungal control. Alternately, they may be used as is, without further oil dilution. When the oil-soluble anti-fungal is diluted with oil, the concentration of anti-fungal plus solubilizer employed depends upon the particular agent or agents used, the effect desired and the adjuvants accompanying the other ingredients. Ordinarily, amounts ranging from about 1 to 10% by weight of anti-fungal plus solubilizer are used, the remainder being oil. Higher concentrations up to 50% or more may be used if desired. The lower range referred to supra in most instances constitutes a fungal-inhibiting concentration. The above pesticidal agents are often accompanied by one or more pesticidal adjuvants which comprise from 0 to 10% by wt. of the total pesticidal composition. The optional agents used to condition, modify or enhance the desired pesticidal effect include such petroleum-soluble adjuvants as, for example, Malathion, DDT and numerous other products known in the technical* and patent literature. Also included as adjuvants are potentiators or synergists typified by piperonyl butoxide, Sesoxane [2-(3,4-methylenedioxyphenoxy)-3,6,9-trioxoundecane], sulfoxide (n-octyl sulfoxide of isosafrole), n-propyl isome, sesame oil extractives, octachlorodipropyl ether, etc. The formulation of the compositions can be achieved by vigorously blending, mixing or stirring the solubilized anti-fungal plus solubilizer in a petroleum-based oil such as a highly refined paraffinic based solvent or an aromatic distillate having a viscosity SSU at 100°F. of about 35, at temperatures ranging from about 25° to 50°C. until a substantially homogenous mixture is achieved. These compositions can be sprayed or fogged using conventional equipment for applying liquids including hand and machine operated sprayers, from the air or from the ground. *See for example "Pesticidal Index", compiled and edited by E. H. Frear 3rd edition, published by College Science Publisher, P. O. Box 798, State College, Pa.

10 - N-(2-alkylidine) aminoguanidines wherein the alkyl moiety (or radical) contains 7 to 15 carbon atoms are known compounds which can be prepared, among other methods by the reaction of aminoguanidine bicarbonate and the appropriate 2-alkanone, containing from 7 to 15 carbon atoms, at elevated temperatures in an inert gaseous and solvent medium, while removing the water produced during the condensation reaction. These "aminoguanidine" derivatives while only sparingly soluble in water give a strongly basic reaction when dispersed in an aqueous environment.

In order to disclose the invention in the greatest possible detail, the following illustrative examples are submitted.

EXAMPLE 1

Solubilization of N-(2-undecylidine) Aminoguanidine

A 300 parts by weight portion of nonylphenol, 150 parts by weight of N-(2-undecylidine) aminoguanidine and 370 parts by weight mixture of the paraffinic oils having a viscosity of approximately 80 S.U.S. at 100°F are stirred and heated to 150°F for about 2 hours until a clear homogenous concentrate is formed.

In the absence of the nonlyphenol solubilizer, the aminoguanidine is soluble in the mineral oil to the extent of less than 0.1% at room temperature.

The above concentrate of N-(2-undecylidine) aminoguanidine when applied at a concentration of 0.275% by weight of the paraffinic oil (500 ppm of active agent) effectively controlled Helminthsporium leaf spot in rice. At double this concentration (1000 ppm of active agent) control of coffee rust fungus is observed.

EXAMPLES 2 to 4

Solubilization of other Oil-Insoluble N-(2-alkylidine) Aminoguanidines

Using the same quantities of nonylphenol and the same process conditions and procedure disclosed in Example 1, the solubilizing process is repeated except that in Example 2, 100 parts by weight of N-(2-heptylidine) aminoguanidine whose general preparation as described in copending Ser. No. is substituted for the "undecylidine" substituent of Example 1. The same solubilizing effect is observed. In the same vein Example 3 shows the solubilization of 100 parts by weight of N-(2-pentadecylidine) aminoguanidine using 300 parts by weight of nonyl phenol and in Example 4 the solubilization of N-(2-tridecylidine) aminoguanidine is accomplished using 300 parts by weight of nonylphenol. In all 3 examples the same quantity and type of oil that is used in Example 1 is employed.

EXAMPLE 5

Solubilization of the Compound of Example 1, using another Phenol-Type Compound and the sam Paraffinic Oil A 350 parts by weight portion of dodecyl phenol is blended in a stirred beaker with 100 parts by weight of N-(2-undecylidine) aminoguanidine and 350 parts by weight of the paraffinic oil of Example 1. As in Example 1 activity is observed against Helminthsporium in rice at concentrations of 1000 ppm of the active agent.

As the numerous examples and the specification indicate, the novel invention offers several advantages both in the process and compositional aspects concerned.

Insofar as the process is concerned, the process offers a practical means of transforming normally oil-insoluble N-(2-alkylidine) aminoguanidine to an oil-soluble form. The process is simple and utilizes commerically available, or easily produced phenol-type compounds as the solubilizing agents. In addition, reaction conditions are mild, usually requiring ambient temperatures and atmospheric pressures. Finally the solubilized product can be obtained in the form of diluted solutions or relatively stable concentrates.

In its compositional aspects, the invention provides the first oil-soluble forms of N-(2-alkylidine) aminoguanidine anti-fungals* wherein the alkyl radicals contain 7 to 15 carbon atoms. In addition, as described earlier, the novel compositions have better adherence to plant substrates, obviating frequent application of pesticides in areas of high humidity and rainfall.

*See copending coassigned Ser. No. 275,678 filed 1972 for a detailed description of testing procedure.

Finally, the subject invention lends itself to numerous changes, substitutions and modifications without departing from the inventive concept. For example, temperatures and pressures are mild, reactants are varied and results are consistent. The metes and bounds are best determined by a reading of the claims taken in conjunction with the specification.

What is claimed is:

1. A process for converting N-(2-alkylidene) aminoguanidines containing from 7 to 15 carbon atoms in the alkyl moiety, which are normally insoluble in paraffinic oils to their oil-soluble complexes, by the steps of:
   a. admixing at least one of said N-(2-alkylidene) aminoguanidines to be solubilized, at temperatures ranging from about 20°C on up to about 100°C,
   b. with a molar excess of at least one alkylated phenol whose alkyl groups contain 3 to 30 carbon atoms, to form an admixture, and
   c. continuing said admixing until a substantially clear solution of oil-soluble complex is obtained.

2. The process of claim 1 wherein the molar excess of alkylated phenol to normally oil-insoluble compound is at least 2:1 and the conversion to the oil-soluble complexes takes place in the presence of up to about 70% by weight of solvent based upon the final reaction mixture.

3. The process of claim 2 wherein the the inert solvent is stripped off to form an oil-soluble concentrate and sufficient paraffinic oil is added to said oil-soluble complex to produce at least a fungal-inhibiting concentration of N-(2-alkylidene).

4. A process for converting N-(2-alkylidene) aminoguanidines containing from 7 to 15 carbon atoms in the alkyl radical, said aminoguanidines normally being insoluble in paraffinic oils into oil soluble form by the steps of:
   a. admixing from about 2 to 8 moles of phenol alkylated with alkyl group containing 6 to 12 carbon atoms, with each mole of said normally oil-insoluble compound in the presence of inert solvent boiling under 100°C to form an admixture, and
   b. heating said admixture containing said N-(2-alkylidene) aminoguanidines, alkylated phenol and inert solvent at a temperature ranging up to 100°C until the inert solvent is stripped off and a clear solution of the admixture of said phenol and said aminoguanidines is obtained.

5. The process of claim 1 wherein the alkylated phenol is a mixture of alkylated phenols wherein said alkylating groups contain from 6 to 12 carbon atoms.

6. A paraffinic, oil-soluble N-(2-undecylidine) aminoguanidine composition having fungal-inhibiting properties upon contact with plants normally susceptible to the attack of fungi consisting of a reaction mixture of:
   a. from 25 to 95 parts by weight of alkylated phenols whose alkyl groups contain 6 to 12 carbon atoms, and
   b. from 75 to 5 parts by weight of N-(2-undecylidine) aminoguanidine,
said reaction mixture having been kept between 20°C and 100°C until a paraffinic, oil-soluble composition is formed.

7. A process for converting N-(2-alkylidene) aminoguanidines containing from 7 to 15 carbon atoms in the alkyl group, which are normally insoluble in paraffinic oils, to their oil-soluble, oil-based complexes, by the steps of:
   a. admixing each part by weight of said aminoguanidines to be solubilized at temperatures ranging from 20° to 100°C,
   b. with 2 to 8 parts by weight of alkylated phenol containing 6 to 12 carbon atoms in the alkyl group, and
   c. 2.4 to 3.70 parts by weight of paraffinic oil to form a reaction mixture,
   d. heating said reaction mixture from 20° to 100°C, until an oil-soluble, oil-based N-(2-alkylidene) aminoguanidine is obtained.

* * * * *